US009491547B2

(12) United States Patent
Lin et al.

(10) Patent No.: US 9,491,547 B2
(45) Date of Patent: Nov. 8, 2016

(54) AUDIO PLAYING SYSTEM AND AUDIO PLAYING METHOD

(71) Applicant: HON HAI PRECISION INDUSTRY CO., LTD., New Taipei (TW)

(72) Inventors: Yi-Cheng Lin, New Taipei (TW); Chang-Da Ho, New Taipei (TW); Ting-Yi Liao, New Taipei (TW); Jen-Tsorng Chang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 74 days.

(21) Appl. No.: 14/579,734

(22) Filed: Dec. 22, 2014

(65) Prior Publication Data

US 2016/0142821 A1    May 19, 2016

(51) Int. Cl.
*H04R 3/12* (2006.01)
(52) U.S. Cl.
CPC .............. *H04R 3/12* (2013.01); *H04R 2420/07* (2013.01); *H04R 2430/01* (2013.01)
(58) Field of Classification Search
None
See application file for complete search history.

(56) References Cited

U.S. PATENT DOCUMENTS

| | | | | |
|---|---|---|---|---|
| 6,212,282 B1* | 4/2001 | Mershon | .............. | H04R 1/1041 381/311 |
| 7,653,344 B1* | 1/2010 | Feldman | ................ | H04H 20/61 455/3.06 |
| 7,840,983 B1* | 11/2010 | Feldman | .................. | H04N 7/18 725/78 |
| 7,949,300 B2* | 5/2011 | Tan | ........................ | H04H 60/80 381/311 |
| 2005/0177256 A1* | 8/2005 | Shintani | ................. | H04R 27/00 700/94 |
| 2006/0258289 A1* | 11/2006 | Dua | .................. | G06F 17/30058 455/41.3 |
| 2010/0188212 A1* | 7/2010 | Jochelson | ................ | H04R 5/04 340/540 |
| 2010/0190532 A1* | 7/2010 | Sampat | ................. | H04W 8/245 455/569.1 |
| 2010/0284389 A1* | 11/2010 | Ramsay | ............ | G06F 17/30017 370/338 |
| 2010/0299639 A1* | 11/2010 | Ramsay | ................ | G06F 3/0486 715/835 |
| 2011/0025912 A1* | 2/2011 | Regler | ................... | H04R 1/028 348/460 |
| 2012/0257776 A1* | 10/2012 | Ozcan | .................. | H04M 1/035 381/345 |
| 2015/0319288 A1* | 11/2015 | Kahn | .................... | H04W 4/008 455/41.2 |
| 2016/0007115 A1* | 1/2016 | Kouthoofd | ............... | H04R 3/12 381/77 |

* cited by examiner

*Primary Examiner* — Brenda Bernardi
(74) *Attorney, Agent, or Firm* — Zhigang Ma

(57) ABSTRACT

An audio playing method is applied to at least one wireless speaker, at least one mobile terminal, and a cloud server. The method includes sending a wireless signal within a coverage area of the wireless speaker, the wireless signal being detected by the speaker when the speaker is in proximity to the mobile terminal. The first identification information of the wireless speaker and second identification information of the mobile terminal are obtained, and control signals indicating the first and the second identification information is transmitted to the cloud server. Audio files corresponding to the second identification information are decoded into an audio stream and the audio stream is transmitted to the one or more wireless speakers which correspond to the first identification information included in the control signal.

18 Claims, 4 Drawing Sheets

AUDIO PLAYING SYSTEM AND AUDIO PLAYING METHOD

FIELD

The subject matter herein generally relates to media processing.

BACKGROUND

Traditional speakers receive musical signals from electronic devices through conductive wires. However, wireless speakers, which can receive musical signals from a music source (for example, a cell phone) over a wireless network and amplify the musical signals, are more convenient.

BRIEF DESCRIPTION OF THE DRAWINGS

Implementations of the present technology will now be described, by way of example only, with reference to the attached figures.

DETAILED DESCRIPTION

Figure 1:
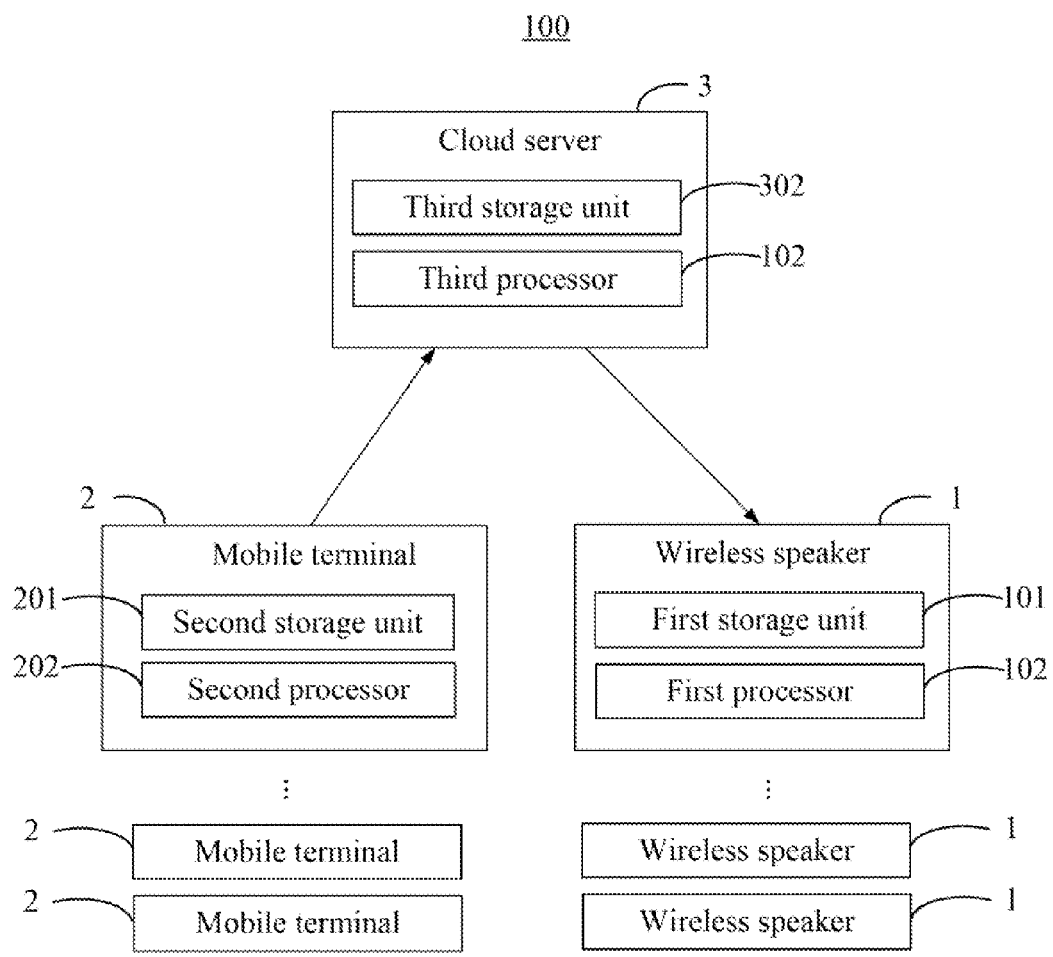
FIG. 1 is a block diagram of an embodiment of an applied environment of an audio playing system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series and the like.

FIG. 1 illustrates one embodiment of an audio playing system 100, the system being applied to at least one wireless speaker 1, at least one mobile terminal 2, and a cloud server 3. The mobile terminal 2 can be any electronic device having a wireless communication function, such as a smart phone, a tablet computer, or a multimedia player.

Each wireless speaker 1 includes a first storage unit 101 and a first processor 102. Each mobile terminal 2 includes a second storage unit 201 and a second processor 202. The cloud server 3 includes a third storage unit 301 and a third processor 302. The first processor 102, the second processor 202, and the third processor 302 can be central processing units, digital processors, or single chips, for example. The types of the first processor 102, the second processor 102, and the third processor 302 can be the same or different types.

Figure 2:
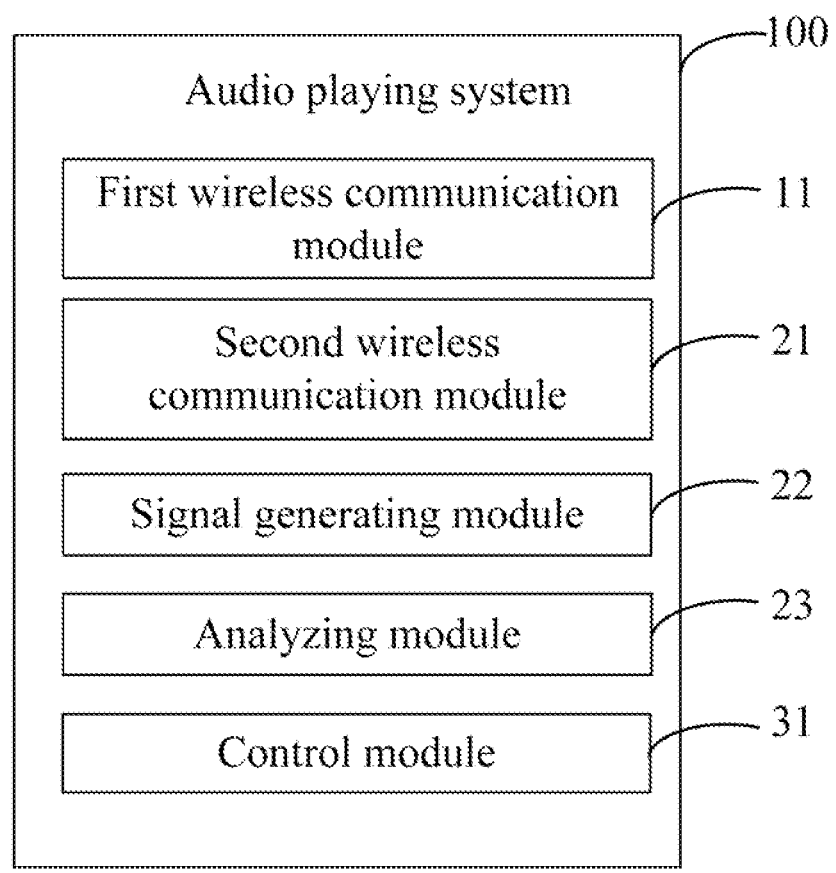
FIG. 2 is a block diagram of the audio playing system of FIG. 1.

FIG. 2 illustrates that the system 100 includes a first wireless communication module 11, a second wireless communication module 21, a signal generating module 22, and a control module 31. Referring to FIGS. 1-2, the first wireless communication module 11 is stored in the first storage unit 101 and executed by the first processor 102 of each wireless speaker 1. The second communication unit 21 and the signal generating module 22 are stored in the second storage unit 201 and executed by the second processor 202 of each mobile terminal 2. The control module 31 is stored in the third storage unit 301 and executed by the third processor 302 of the cloud server 3.

The first wireless communication module 11 sends a wireless signal within a wireless coverage area of the wireless speaker 1 having the first wireless communication module 11.

The second wireless communication module 21 detects a wireless signal within a wireless coverage area of the mobile terminal 2 having the second wireless communication module 21, when one or more wireless speakers 1 are adjacent to the mobile terminal 2, and obtains first identification information of each of the one or more wireless speakers 1. The first and the second wireless communication units 11, 21 can be BLUETOOTH® communication units or WIFI communication units.

When the second wireless communication unit 21 obtains the first identification information of the one or more wireless speakers 1, the signal generating unit 22 obtains second identification information of the mobile terminal 2. The signal generating unit 22 further generates a first control signal according to the obtained first identification information and the obtained second identification information, and transmits the first control signal to the cloud server 3. In at least one embodiment, the mobile terminal 2 is a cell phone, and the second identification information is a SIM card number of the cell phone.

In at least one embodiment, the third storage unit 301 of the cloud server 3 stores second identification information of different mobile terminals 2, different audio files, and a first relationship between the second identification information and the audio files. Each audio file corresponds to the second identification information of one mobile terminal 2. In detail, the mobile terminal 2 first transmits a registration request to the cloud server 3 with the second identification information thereof, to register with the cloud server 3. When the cloud server 3 registers the second identification information of the mobile terminal 2, the mobile terminal 2 logs in to the cloud server 3 using the second identification information, and transmits at least one audio file stored in the second storage unit 201 to the cloud server 3, to instruct the cloud server 3 to store the audio file associated with the second identification information of the mobile terminal 2 to the third storage unit 301.

The control module 31, according to the first relationship, determines upon at least one audio file corresponding to the second identification information which is included in the first control signal, decodes the determined audio file to an audio stream, and transmits the audio stream to the one or more wireless speakers 1 corresponding to the first identification information included in the first control signal. Upon receiving the audio stream, each of the one or more wireless speakers 1 starts to play the audio file originating from the mobile terminal 2. With the above configuration, a user can control one or more one wireless speaker 1 to playback the audio file from his/her mobile terminal 2 simply by approaching the one or more wireless speakers 1 with the mobile terminal 2.

In at least one embodiment, the control module 31 transmits the audio stream to each of the one or more wireless speakers 1 via a wireless network. The wireless network can be WIFI network or BLUETOOTH® network for example. The first identification information can be the IP address of a wireless speaker 1. The third storage unit 301 of the cloud server 3 further stores a second relationship between first identification information of different wireless speakers 1 and different IP addresses. Each IP address corresponds to first identification information of one wireless speaker 1. In this case, the control module 31, according to the second relationship, determines upon the IP address as corresponding to the first identification information which is included in the first control module, and transmits the audio stream to the one or more wireless speakers 1 according to the one or more determined IP addresses.

In at least one embodiment, the system 100 further includes an analyzing module 23 stored in the second storage unit 201 and executed by the second processor 202 of each mobile terminal 2. The analyzing module 23 determines whether a characteristic strength of the wireless signal is greater than a threshold level before the signal generating module 22 obtains second identification information of the mobile terminal 2. If it is greater, the signal generating module 22 obtains second identification information of the mobile terminal 2, generates the first control signal, and transmits the first control signal to the cloud server 3. The characteristic strength can be the amplitude level of the wireless signal or the increasing speed of the amplitude level.

In at least one embodiment, after the signal generating module 22 transmits the first control signal to the cloud server 3, the analyzing module 23 further determines whether only one wireless speaker 1 is adjacent to the mobile terminal 2. If so, the analyzing module 23 further determines whether the characteristic strength of the wireless signal keeps changing. If the characteristic strength of the wireless signal keeps changing, the mobile terminal 2 is deemed to be approaching or moving away from the wireless speakers 1. Then, the signal generating module 22 further generates a second control signal according to the first identification information of the wireless speaker 1 and the characteristic strength of the wireless signal, and transmits the second control signal to the cloud server 3. The control module 31 further generates a volume adjust command according to the characteristic strength of the wireless signal included in the second control signal, and transmits the volume adjust command to the wireless speaker 1 corresponding to the first identification information included in the second control signal. The volume adjust command is configured to direct the wireless speaker 1 to adjust the volume of the playback of the audio file according to the characteristic strength of the wireless signal. In at least one embodiment, the playback volume of the audio file is proportional to the characteristic strength of the wireless signal.

If at least two wireless speakers 1 are adjacent to the mobile terminal 2, the analyzing module 23 further determines whether the characteristic strength of the wireless signal from each of the at least two wireless speakers 1 keeps changing. If the characteristic strength of the wireless signal from one of the at least two wireless speakers 1 keeps changing, the analyzing module 23 generates the second control signal according to the first identification information of the wireless speaker 1 and the characteristic strength of the wireless signal, and transmits the second control signal to the cloud server 3. The control module 31 further generates the volume adjust command which direct the wireless speaker 1 to adjust the volume of the playback of the audio file according to the characteristic strength of the wireless signal.

In at least one embodiment, if the analyzing module 23 determines that the characteristic strength of the wireless signal is decreasing overall, the analyzing module 23 further determines whether or not the characteristic strength of the wireless signal is less than the threshold level. If it is less, it indicates that the mobile terminal 2 is moving away from the wireless speaker 1, that is, the wireless speaker 1 is becoming physically remote from the mobile terminal 2. Then, the signal generating module 22 further generates a third control signal according to the first identification information of the wireless speaker 1, and transmits the third control signal to the cloud server 3. The control module 31 further stops transmitting the audio stream to the wireless speaker 1 corresponding to the first identification information included in the third control signal. As such, the wireless speaker 1 stops playing the audio file. In at least one embodiment, the control module 31 further transmits a power saving command to the wireless speaker 1, to instruct the wireless speaker 1 to enter a standby mode or a sleep mode.

Figure 3:
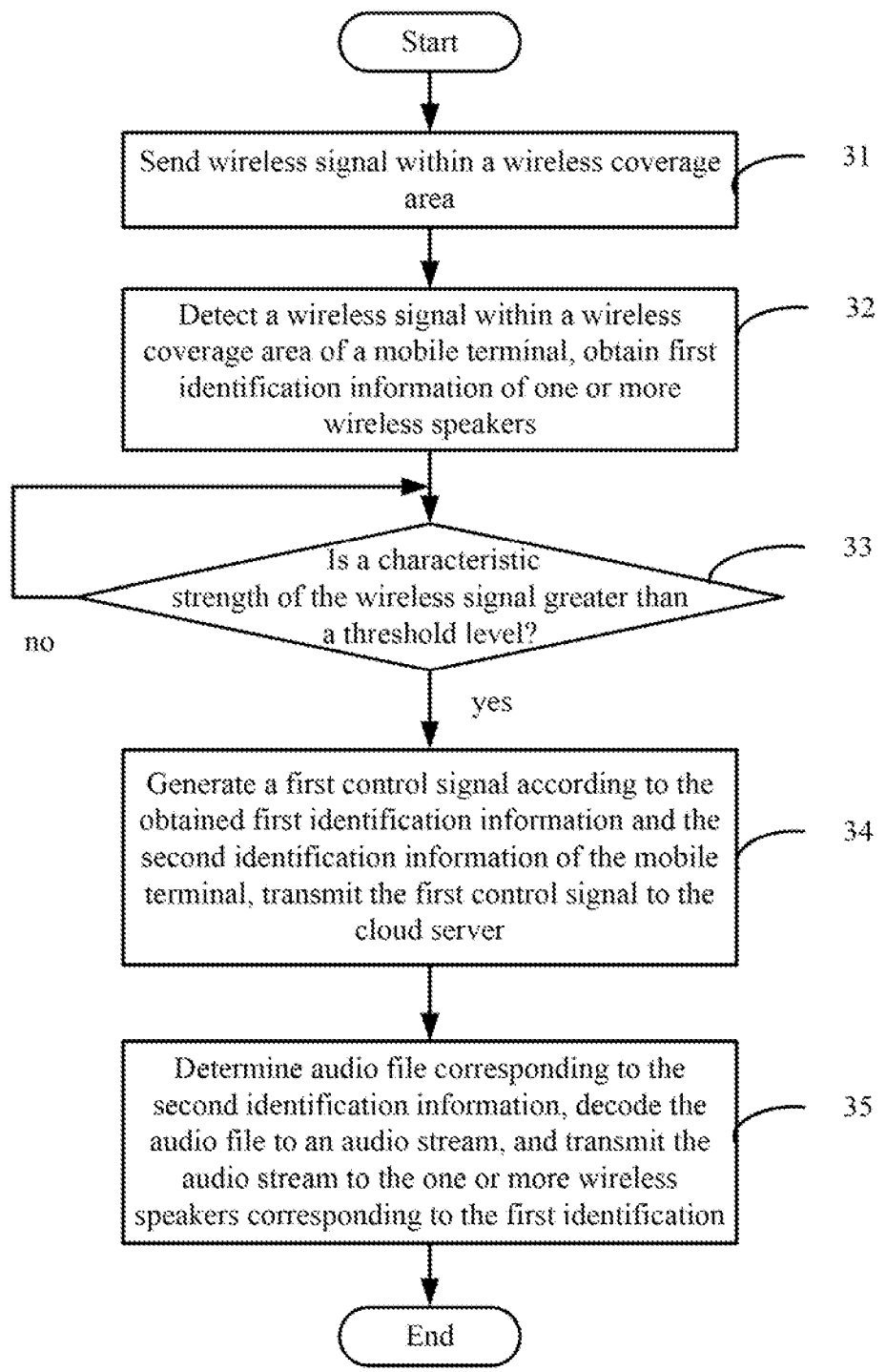
FIG. 3 is a flowchart of an embodiment of an audio playing method.

Referring to FIG. 3, a flowchart of an audio playing method is presented in accordance with an example embodiment which is being thus illustrated. The example audio playing method is provided by way of example, as there are a variety of ways to carry out the method. The audio playing method described below can be carried out using the configurations illustrated in FIGS. 1 and 2, for example, and various elements of these figures are referenced in explaining example audio playing method. Each block shown in FIG. 3 represents one or more processes, methods or subroutines, carried out in the exemplary audio playing method. Additionally, the illustrated order of blocks is by example only and the order of the blocks can change according to the present disclosure. The exemplary audio playing method can begin at block 31.

At block 31, a first wireless communication module sends a wireless signal within a wireless coverage area of the wireless speaker.

At block 32, a second wireless communication module detects a wireless signal within a wireless coverage area of the mobile terminal when one or more wireless speakers are adjacent to the mobile terminal, and obtains first identification information of each of the one or more wireless speakers.

At block 33, an analyzing module determines whether a characteristic strength of the wireless signal is greater than a threshold level. If yes, the procedure goes to block 44; otherwise, block 43 is repeated.

At block 34, a signal generating unit obtains second identification information of the mobile terminal, generates a first control signal according to the obtained first identification information and the obtained second identification information, and transmits the first control signal to the cloud server.

At block 35, a control module determines upon at least one audio file stored in the cloud server corresponding to the second identification information which is included in the first control signal, decodes the determined audio file to an audio stream, and transmits the audio stream to the one or more wireless speakers corresponding to the first identification information included in the first control signal. As such, the one or more wireless speakers can start to play the audio file originating from the mobile terminal.

Figure 4:
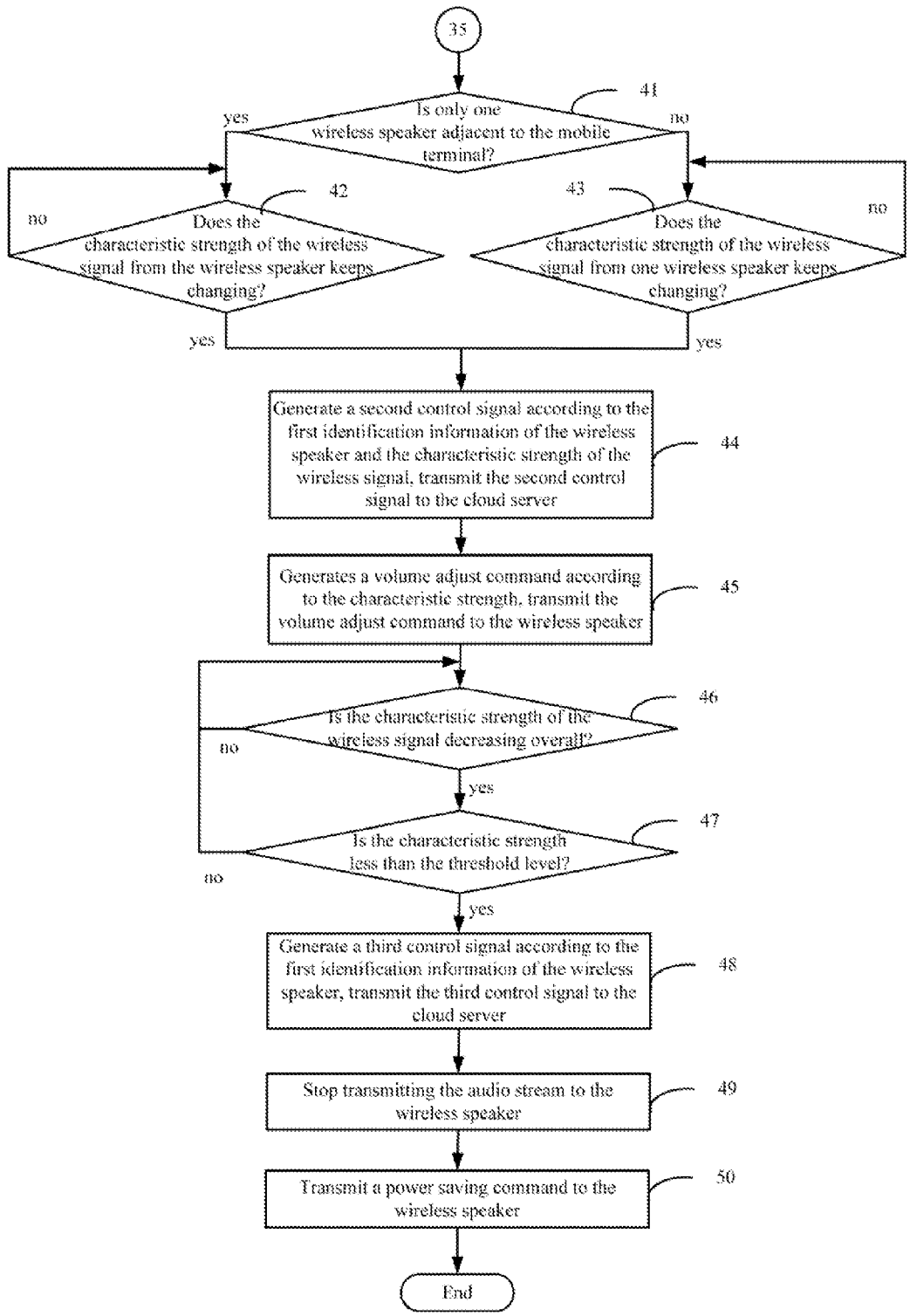
FIG. 4 is a detailed flow chart of block 35 of the method of FIG. 3.

Referring to FIG. 4, a detail flowchart of the audio playing method after the block 35 of FIG. 3 is presented in accordance with an example embodiment which is being thus illustrated. The example audio playing method is provided by way of example, as there are a variety of ways to carry out the method. The audio playing method described below can be carried out using the configurations illustrated in FIGS. 1 and 2, for example, and various elements of these figures are referenced in explaining example audio playing method. Each block shown in FIG. 4 represents one or more processes, methods or subroutines, carried out in the exemplary audio playing method. Additionally, the illustrated order of blocks is by example only and the order of the blocks can change according to the present disclosure.

At block 41, the analyzing module further determines whether only one wireless speaker is adjacent to the mobile terminal. If yes, the procedure goes to block 42; otherwise, the procedure goes to block 43.

At block 42, the analyzing module determines whether the characteristic strength of the wireless signal from the wireless speaker keeps changing. If yes, the procedure goes to block 44; otherwise, block 42 is repeated.

At block 43, the analyzing module determines whether the characteristic strength of the wireless signal from one wireless speaker keeps changing. If yes, the procedure goes to block 44; otherwise, block 43 is repeated.

At block 44, the signal generating module further generates a second control signal according to the first identification information of the wireless speaker and the characteristic strength of the wireless signal, and transmits the second control signal to the cloud server.

At block 45, the control module further generates a volume adjust command according to the characteristic strength of the wireless signal, and transmits the volume adjust command to the wireless speaker corresponding to the first identification information included in the second control signal. The volume adjust command is configured to direct the wireless speaker to adjust the volume of the playback of the audio file according to the characteristic strength of the wireless signal.

At block 46, the analyzing module further determines whether the characteristic strength of the wireless signal is decreasing overall. If yes, the procedure goes to block 47; otherwise, block 46 is repeated.

At block 47, the analyzing module further determines whether the characteristic strength of the wireless signal is less than the threshold level. If yes, the procedure goes to block 48; otherwise, block 46 is repeated.

At block 48, the signal generating module further generates a third control signal according to the first identification information of the wireless speaker, and transmits the third control signal to the cloud server.

At block 49, the control module further stops transmitting the audio stream to the wireless speaker corresponding to the first identification information included in the third control signal. As such, the wireless speaker stops playing the audio file.

At block 50, the control module further transmits a power saving command to the wireless speaker, to instruct the wireless speaker to enter a standby mode or a sleep mode.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. An audio playing system applied to at least one wireless speaker, at least one mobile terminal, and a cloud server, each wireless speaker including a first storage unit and a first processor, each mobile terminal including a second storage unit and a second processor, the cloud server including a third storage unit and a third processor, the audio playing system comprising:

a first wireless communication module stored in the first storage unit and executed by the first processor, the first wireless communication module configured to send a wireless signal within a wireless coverage area of the wireless speaker;

a second wireless communication module stored in the second storage unit and executed by the second processor, the second wireless communication module configured to detect a wireless signal within a wireless coverage area of the mobile terminal when one or more wireless speakers are adjacent to the mobile terminal, and obtain first identification information of each of the one or more wireless speakers;

a signal generating unit stored in the second storage unit and executed by the second processor, the signal generating unit configured to obtain second identification information of the mobile terminal when the second wireless communication unit obtains the first identification information, the signal generating unit further configured to generate a first control signal according to the obtained first identification information and the obtained second identification information, and transmit the first control signal to the cloud server; and a control module stored in the third storage unit and executed by the third processor, the control module configured to determine at least one audio file corresponding to the second identification information which is included in the first control signal, decode the determined audio file to an audio stream, and transmit the audio stream to the one or more wireless speakers corresponding to the first identification information included in the first control signal, thereby allowing the one or more wireless speakers to start to play the audio file.

2. The audio playing system of claim 1, wherein the control module is configured to determine the at least one audio file corresponding to the second identification information according to a first relationship stored in the third storage unit; the first relationship is between second identification information of different mobile terminals and different audio files, and each audio file corresponds to second identification information of one mobile terminal.

3. The audio playing system of claim 1, wherein the second identification information is a SIM card number of the mobile terminal.

4. The audio playing system of claim 1, the control module is configured to transmit the audio stream to each of the one or more wireless speakers via a wireless network.

5. The audio playing system of claim 1, wherein the first identification information is an IP address of a wireless speaker.

6. The audio playing system of claim 5, wherein the control module is configured to determine the IP address corresponding to the first identification information which is included in the first control module according to a second relationship stored in the third storage unit, and transmit the audio stream to the one or more wireless speakers according to the one or more determined IP addresses; the second relationship is between first identification information of different wireless speakers and different IP addresses; and each IP address corresponds to first identification information of one wireless speaker.

7. The audio playing system of claim 1, further comprising an analyzing module stored in the second storage unit and executed by the second processor, wherein the analyzing module is configured to determine whether a characteristic strength of the wireless signal is greater than a threshold level before the signal generating module generates the first control signal; and the signal generating module generates the first control signal and transmits the first control signal to the cloud server if the characteristic strength of the wireless signal is greater than the threshold level.

8. The audio playing system of claim 7, wherein the characteristic strength is an amplitude level of the wireless signal.

9. The audio playing system of claim 7, wherein the analyzing module is further configured to determine whether only one wireless speaker is adjacent to the mobile terminal, and determine whether the characteristic strength of the wireless signal keeps changing if only one wireless speaker is adjacent to the mobile terminal;
the signal generating module is further configured to generate a second control signal according to the first identification information of the wireless speaker and the characteristic strength of the wireless signal if the characteristic strength of the wireless signal keeps changing, and transmit the second control signal to the cloud server;
the control module is further configured to generate a volume adjust command according to the characteristic strength of the wireless signal included in the second control signal, and transmit the volume adjust command to the wireless speaker corresponding to the first identification information included in the second control signal; and
the volume adjust command is configured to direct the wireless speaker to adjust a volume of playback of the audio file according to the characteristic strength of the wireless signal.

10. The audio playing system of claim 9, wherein the volume of the playback of the audio file is proportional to the characteristic strength of the wireless signal.

11. The audio playing system of claim 9, wherein if at least two wireless speakers are adjacent to the mobile terminal, the analyzing module is further configured to determine whether the characteristic strength of the wireless signal from each of the at least two wireless speakers keeps changing, generate the second control signal if the characteristic strength of the wireless signal from one of the at least two wireless speakers keeps changing, and transmit the second control signal to the cloud server; the control module is further configured to generate the volume adjust command which directs the wireless speaker to adjust the volume of the playback of the audio file.

12. The audio playing system of claim 9, wherein the analyzing module is further configured to determine whether the characteristic strength of the wireless signal is less than the threshold level if the characteristic strength of the wireless signal is decreasing overall; the signal generating module is further configured to generate a third control signal according to the first identification information of the wireless speaker if the characteristic strength of the wireless signal is less than the threshold level, and transmit the third control signal to the cloud server; the control module is further configured to stop transmitting the audio stream to the wireless speaker corresponding to the first identification information included in the third control signal.

13. The audio playing system of claim 12, wherein the control module is further configured to transmit a power saving command to the wireless speaker to instruct the wireless speaker to enter a standby mode or a sleep mode.

14. An audio playing method applied to at least one wireless speaker, at least one mobile terminal, and a cloud server, the audio playing method comprising:
sending a wireless signal within a wireless coverage area of at least one wireless speaker;
detecting a wireless signal within a wireless coverage area of the mobile terminal when one or more wireless speaker are adjacent to the mobile terminal, and obtaining first identification information of the one or more wireless speakers;
obtaining second identification information of the mobile terminal;
generating a first control signal according to the obtained first identification information and the obtained second identification information, and transmitting the first control signal to the cloud server;
determining at least one audio file corresponding to the second identification information included in the first control signal, decoding the determined audio file to an audio stream; and
transmitting the audio stream to each adjacent wireless speaker corresponding to the first identification information which is included in the first control signal, thereby allowing the one or more wireless speakers to start to play the audio file.

15. The audio playing method of claim 14, wherein the step of obtaining second identification information of the mobile terminal further comprises:
determining whether a characteristic strength of the wireless signal is greater than a threshold level; and
obtaining second identification information of the mobile terminal if the characteristic strength of the wireless signal is greater than the threshold level.

16. The audio playing method of claim 15, further comprising:
determining whether only one wireless speaker is adjacent to the mobile terminal;
determining whether the characteristic strength of the wireless signal keeps changing if only one wireless speaker is adjacent to the mobile terminal;
generating a second control signal according to the first identification information of the wireless speaker and the characteristic strength of the wireless signal if the characteristic strength of the wireless signal keeps changing;
transmitting the second control signal to the cloud server;
generating a volume adjust command according to the characteristic strength of the wireless signal; and
transmitting the volume adjust command to the wireless speaker corresponding to the first identification information which is included in the second control signal, wherein the volume adjust command is configured to direct the wireless speaker to adjust a volume of playback of the audio file according to the characteristic strength of the wireless signal.

17. The audio playing method of claim 16, further comprising:

determining whether the characteristic strength of the wireless signal is less than the threshold level if the characteristic strength of the wireless signal is decreasing overall;

generating a third control signal according to the first identification information of the wireless speaker if the characteristic strength of the wireless signal is less than the threshold level;

transmitting the third control signal to the cloud server; and stopping transmitting the audio stream to the wireless speaker corresponding to the first identification information included in the third control signal.

18. The audio playing method of claim 17, further comprising:

transmitting a power saving command to the wireless speaker, to instruct the wireless speaker to enter a standby mode or a sleep mode.

* * * * *